Patented June 12, 1923.

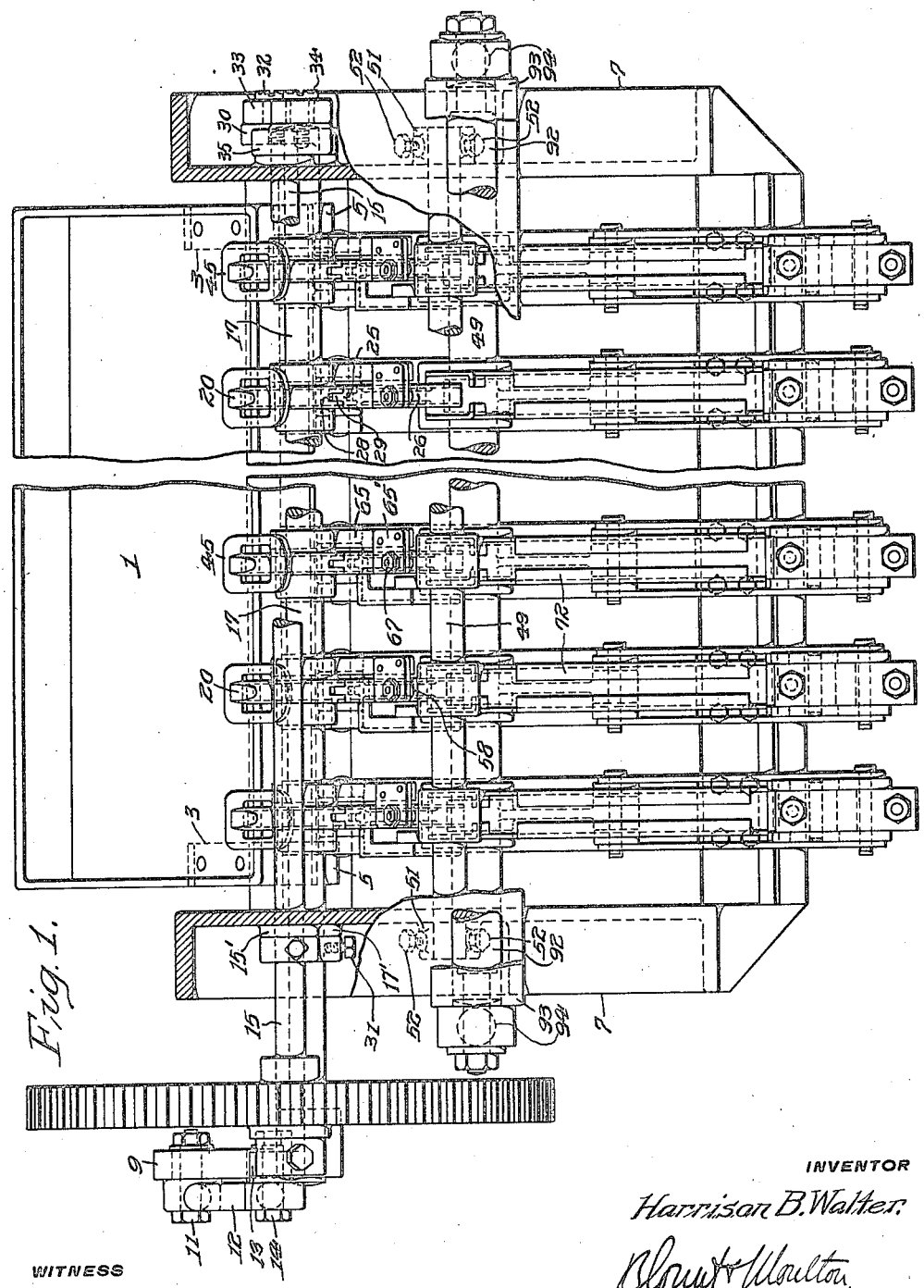

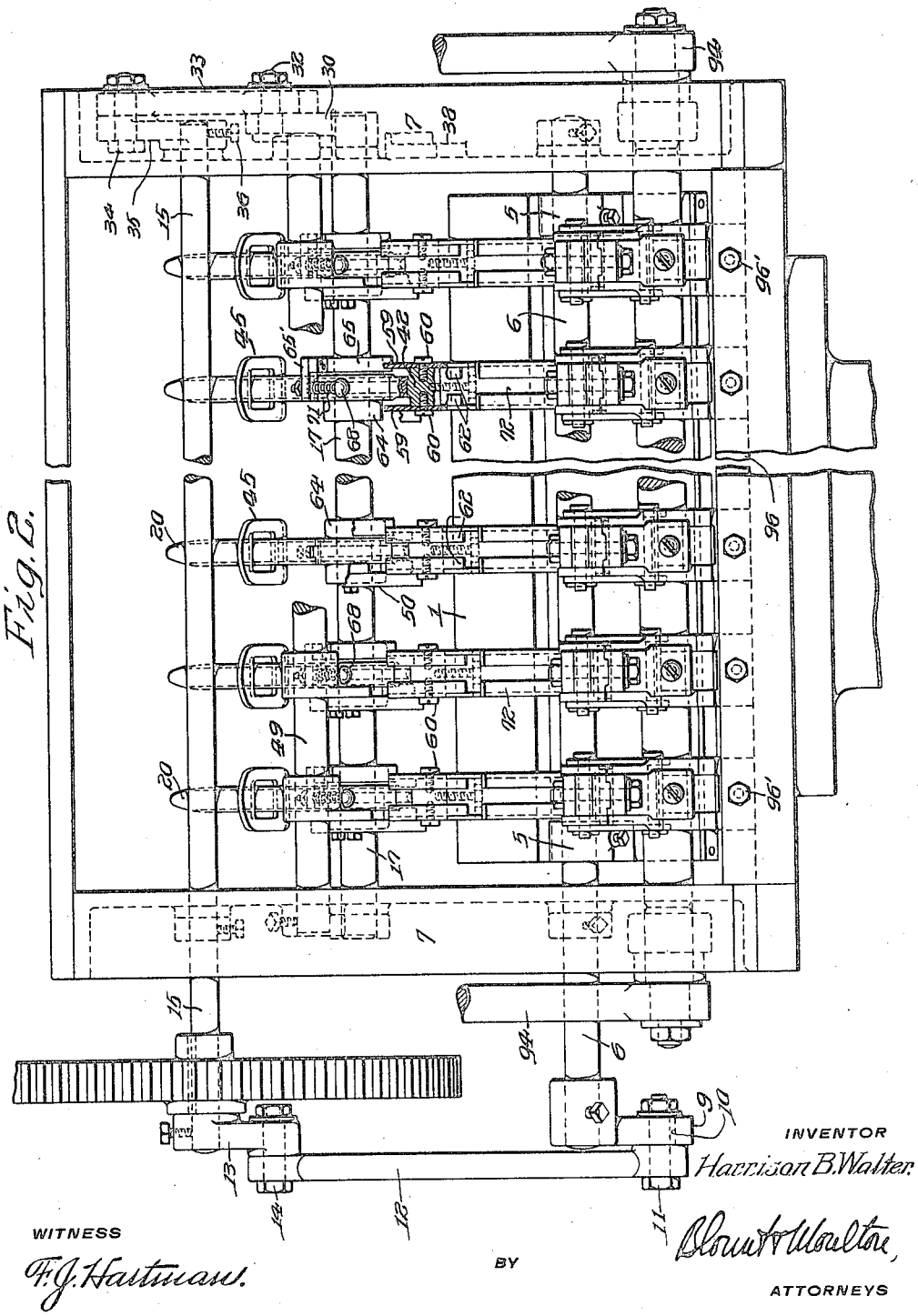

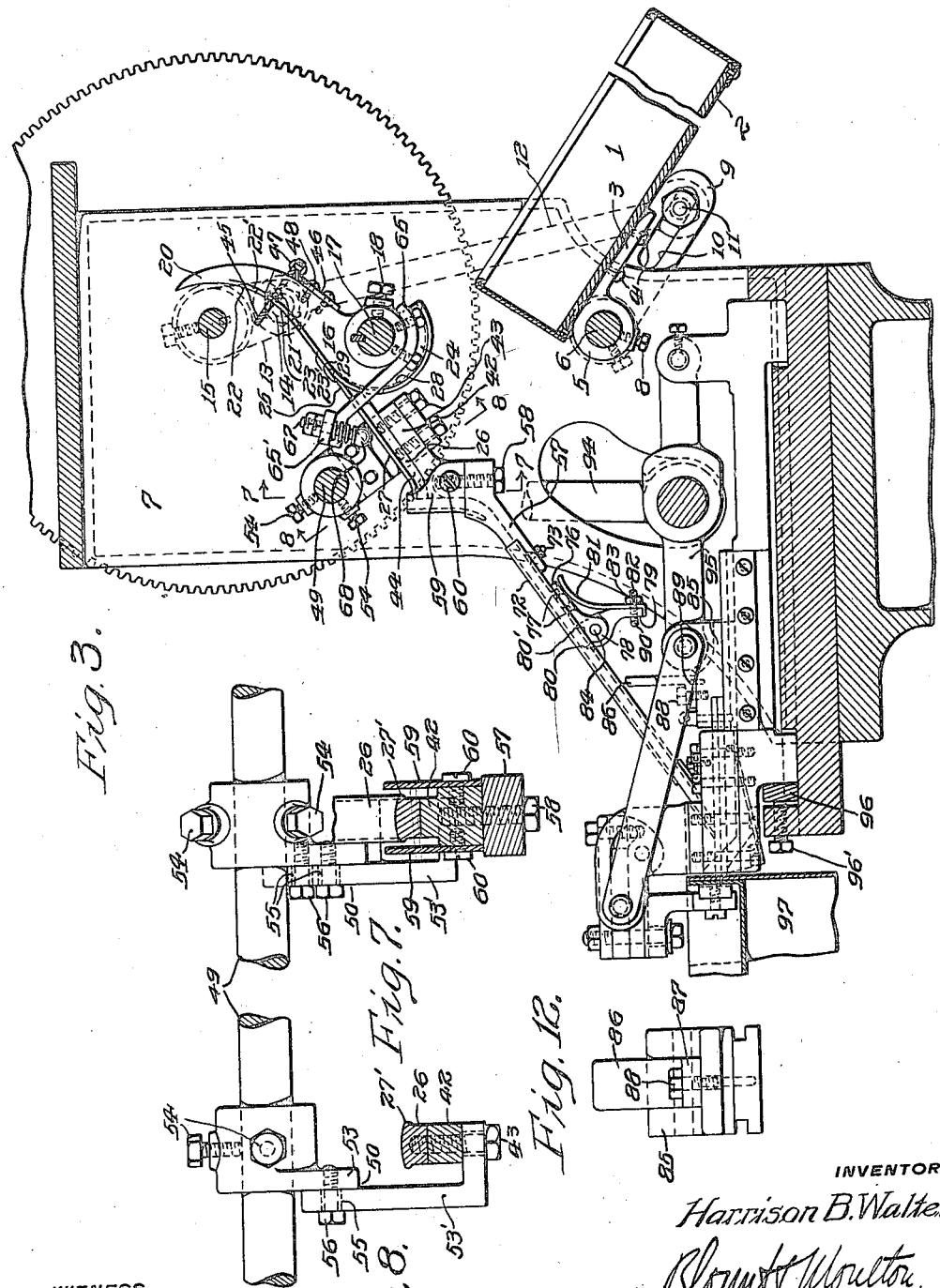

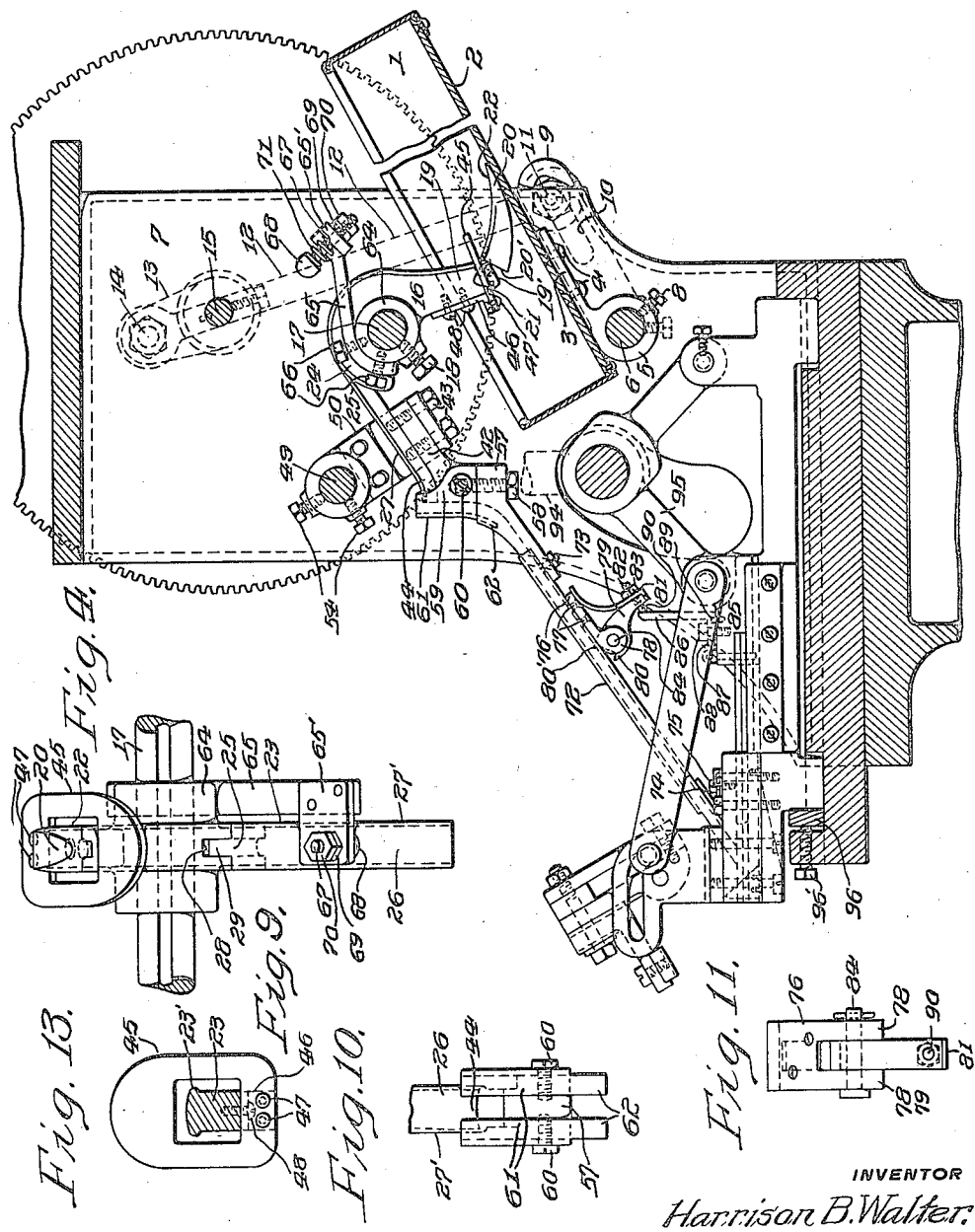

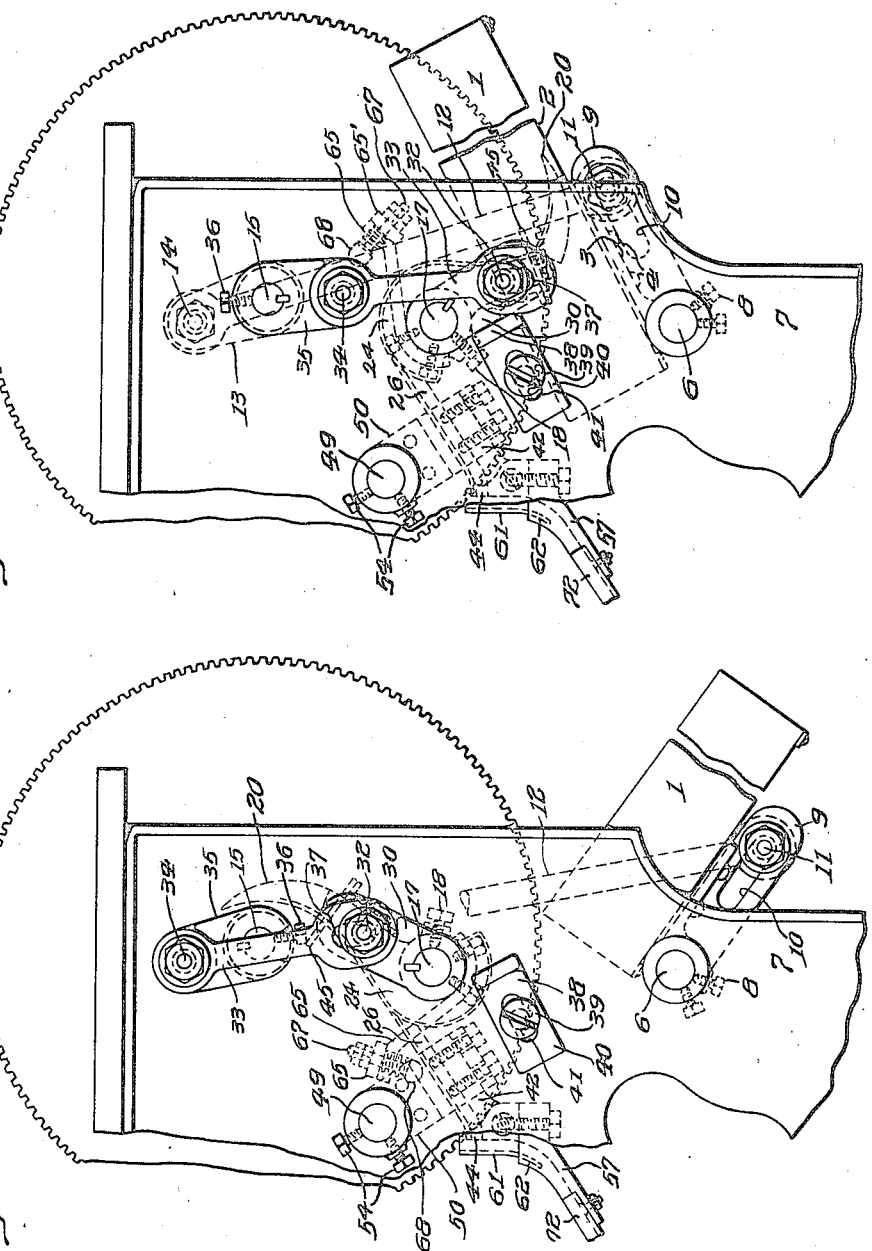

1,458,161

UNITED STATES PATENT OFFICE.

HARRISON B. WALTER, OF PHILADELPHIA, PENNSYLVANIA, ASSIGNOR TO FIBRE CONTAINER COMPANY, A CORPORATION OF PENNSYLVANIA.

MULTIPLE STAPLING MACHINE.

Application filed October 22, 1919. Serial No. 332,471.

*To all whom it may concern:*

Be it known that I, HARRISON B. WALTER, a citizen of the United States, and a resident of the city of Philadelphia, county of Philadelphia, State of Pennsylvania, have invented certain new and useful Improvements in Multiple Stapling Machines, of which the following is a specification, reference being had to the accompanying drawing, forming a part thereof.

The invention relates to a stapling machine of the multiple type wherein any number of a plurality of staples may be simultaneously driven through and clinched about the parts to be secured together by such staples.

The invention, however, relates more particularly to the staple feeding device in connection with the separating mechanism of which the latter is in the form of a reciprocating hopper or pan combined with a reciprocating separator, and the former receives staples from said separating means in a certain order and feeds, as required, a plurality of said staples simultaneously to the respective points where the driving and clinching are performed. The invention relates to a machine of the type shown and described in my copending application, Serial No. 290,155, filed April 15, 1919, and is an improvement upon the machine shown and described in my copending application, Serial No. 320,897, filed August 30, 1919.

As in said copending applications one of the objects of the invention is to provide a machine that is adapted to use previously made staples with automatic means to separate and feed the same in multiple to the driving and clinching means.

Another object is to construct a machine with a common means for containing, and controlling the position of, the staples and from which means the staples for the several driving means may be separated and fed as required.

Another object is to provide a machine of the type aforesaid with a means for separating and properly positioning the separated staples in predetermined order to be successively operated upon by the feeding means.

Another object is to provide a machine of the character above mentioned with means for efficiently and efficaciously separating a number of staples from a conglomerate mass of staples and to guide the same in a defined order to the feeding means.

Another object is to provide such machine with a novel and useful means for feeding said separated staples successively by gravity from the separating means to a clinching and driving means.

A still further object is to provide a novel and useful feeding means of the type aforesaid whereby the movement of the staples throughout the feeding means from the separating means to the driving and clinching means is open to view as well as that the staples are accessible at any point of travel along said feeding means.

Such other and advantageous objects of my invention will be disclosed by the following specification and illustrated in the accompanying drawing.

As aforesaid, the present invention relates to a machine for driving made staples in multiple rather than for successively driving staples made from a piece of wire strip of indefinite length from which staple pieces must first be cut and then shaped into the form of staples prior to their stapling function. The advantages of using made staples for the purposes mentioned are clearly set forth in my aforesaid copending applications.

A practical embodiment of my invention is illustrated in the accompanying drawing, in which;

Fig. 1 is a top plan view of the device;

Fig. 2 is a vertical front view in elevation of the same with parts shown in section;

Fig. 3 is a vertical transverse sectional view of the same with the parts in one position of operation;

Fig. 4 is a similar view with the parts in another position of operation;

Fig. 5 is a side view in elevation of a detail of the staple separating and transferring device showing the parts in one position of operation;

Fig. 6 is a similar view of the same showing the parts in another position of operation;

Fig. 7 is a detail section taken on line 7—7 of Fig. 3;

Fig. 8 is a detail section taken on line 8—8 of Fig. 3;

Fig. 9 is a top plan view of the bridge, hanger members and parts connected thereto;

Fig. 10 is a front detail view of the raceway hopper and staple guide thereto;

Fig. 11 is a detail front view of the feed trigger;

Fig. 12 is a detail front view of the feed post adapted to cooperate with the feed trigger, and, Fig. 13 is a detail view of one of the trap or guard plates secured to the separating hooks.

Referring now more particularly to the drawing in which similar reference characters are used to designate the corresponding parts in the several views, I have shown in a multiple stapling machine of the type referred to above, generally, a reciprocating hopper or pan for containing a mass or quantity of made staples, reciprocating separating means in the form of hooks operating in conjunction with said reciprocating hopper for receiving, transferring and guiding the separated staples or fastening elements from the hopper or pan to the feeding device, feeding devices for receiving said staples from said separating means and for simultaneously feeding the staples to a plurality of raceways or chutes whereby the staples move by gravity to several driving and clinching means, and driving and clinching means, which may be of any suitable type, as that referred to and disclosed in my copending applications hereinbefore mentioned.

The staple storing and containing means comprises a hopper or pan 1, of preferably rectangular form, to the bottom 2 of which may be suitably secured one or more hinge straps 3 by any suitable securing means, such as screws or rivets 4. These straps are provided with a bearing sleeve or hub 5 adapted to be adjustably fastened to a shaft 6 transversely disposed in the machine and supported in side walls 7 thereof. These straps also may be suitably keyed to the shaft 6, to angularly reciprocate therewith, and held from longitudinal movement relative thereto by means of set screws 8.

To the end of the shaft 6, which projects beyond one of the side walls 7, preferably at the left side of the machine as viewed in Fig. 2 of the drawing, is secured or keyed a crank arm 9 to angularly reciprocate therewith. The crank arm 9 is provided, near its free end, with an elongated slot 10 in which may be adjustably attached a pivot stud 11. To this stud may be pivotally secured, at an end thereof, a link 12 with the other end of the link pivotally connected to the free end of a crank 13 by means of a pivot stud 14, the crank being keyed to the rotating shaft 15 for rotation therewith.

The separating means comprises a plurality of separating elements or hooks 16 mounted upon a transverse shaft 17 in predetermined adjusted spaced relation and adapted to angularly reciprocate or oscillate therewith. The shaft 17 extends transversely through the machine, between the side walls 7, and is supported in suitable bearings 17' provided on said side walls. The separating elements are keyed to the shaft and secured in adjusted relative position in any suitable manner, as by means of set screws 18. Each separating element comprises a shank member 19 and a tapered spur member 20 pivotally connected together by a pivot or tongue connection 21 whereby the tapered spur 20 is adapted to have a certain amount of angular movement relative to the shank member 19. In certain positions, where the shoulders 20' and 19' of the spur 20 and the shank 19 respectively are in contact, the relatively movable parts 19 and 20 act as a single rigid member. The spur 20 is curved and tapered to provide a curved surface 22, on the top thereof, which blends with the curved surface 23 of the shank member and is also tapered at the sides thereof for facilitating the engagement of the fastening elements or staples therewith. The shank member is provided with a circular hanger portion 24 at the periphery of which is located an end 25 of a bridge member 26, such end 25 being cut into an arcuate form to closely fit against said periphery at all times during the angular reciprocation of the shank member and the hanger portion about the axis of the shaft 17, whereby the surfaces 22 and 23 form a continuous smooth path with the surface 27 of the bridge member. The periphery of the circular hanger portion 24 may be also provided with a groove 28 in which may slide a tongue or guide member 29 provided on the lower surface of the end 25 of the bridge member.

At an end of the shaft 17, preferably at the right side of the machine as viewed in Fig. 2, is provided a crank 30 which may be keyed thereto to rotate therewith and held from longitudinal movement by set screws 31. The free end of the crank arm 30 is provided with a pivot stud 32 to which may be pivotally connected the lower end of a link 33, the other end of said link being connected to a pivot stud 34 on a crank 35, the latter being keyed to the continuously rotating shaft 15 and held from longitudinal movement by set screws 36. The lower end of the link 33 is provided with an elongated slot 37 whereby a certain amount of relatively free or idle movement may be obtained between the link 33 and the pivot stud 32. Adjacent the crank arm 30, when in its lowermost position, is attached, to one of the side walls 7 of the machine, an abutment or stop 38 by any suitable attaching means, such as screws 39. The flange 40 of this abutment may be provided with an elongated slot 41 by which the abutment may be adjustably secured in any desired position relative to the crank arm 30. The abutment or stop is positioned so that as the crank arm 30 is moved to its lowermost position the same will contact with said stop for producing a jarring effect upon the separating elements in order to loosen or disentangle any fastening elements or staples that might possibly have become entangled or jammed thereupon, the link being adapted, by reason of the slot 37 provided therein, of moving idly relative to the pivot stud 32 upon further movement thereof by the continuous rotation of the crank 35.

Each bridge member 26 may be suitably secured in an inclined position, greater than the angle of repose, to a supporting bracket 42 by means of screws 43, with the lower end 44 of the bridge curving into a horizontal position. This provides for a simple and efficient means for conveying the fastening elements or staples from the separating hooks to the feeding devices. Each of the separating elements, including the spur and the shank, as well as the bridge member, are of a width equal to slightly less than the distance between the legs of a staple and with the sides thereof substantially parallel whereby the legs of the staples lie in close proximity or adjacent to said sides as they slide down over the inclined curved surfaces 22 and 23 of the hook and the surface 27 of the bridge. The surfaces 22, 23 and 27 are all provided at the lateral edges with enlarged portions or beadlike formations 22', 23' and 27' which overhang the sides of the separators, the hangers and the bridges, thereby providing from a minimum amount of friction between the parts mentioned and the legs of the moving staples.

Each separating element may be provided with a trap member or guard plate 45 substantially of the form of a rectangular frame with rounded ends and with its top and lateral portions spaced from the top and side surfaces of the separator shank a distance slightly greater than the thickness of the heads and legs of the staples, whereby the latter may freely pass in single succession through said guard over and along said shank. The guard plates may be rigidly secured to the flanged end of an angle iron 46 as by rivets 47, the shank of the angle iron being secured to the under side of the shank 17 by any suitable means, as by screws 48. Each guard plate is of utility for preventing imperfectly formed staples from passing along the separating members 16, interfering with the free passage of the improperly formed staples. The guard plate is of sufficient extent to further insure the holding back of superfluous or irregularly positioned staples, which may find their way to the shanks 19.

From the above it is apparent that as the hopper is caused to incline in one direction or another that the staples placed therein may slide from one end of the hopper to the other whereupon certain of said staples will be adapted to engage with the several separators upon the spurs 20 thereof, with the legs of the staples depending on both sides of the separators as the heads of the staples slide over the top surfaces of the spur and shank portions of the separators. The spurs are also tapered at the sides thereof whereby the same may act to laterally urge the staples, which may not be squarely presented to the ends thereof, into the portions where the staples may properly engage with the separators. This provides for a very efficient means for insuring the separation of a large number of staples at each operation of the hooks and hopper.

Transversely between the side wall 7 of the machine is supported at a suitable height a carrier bar 49 from which may depend bridge hangers 50, the ends of the carrier bar being suitably supported in the bosses 51 provided on the side wall 7 and secured thereto, to prevent turning of said carrier bar in said bosses, by set screws 52. Each bridge hanger comprises an upper member 53 and a lower member 53' of which the former is adjustably secured, relative to the other members along the carrier bar 49, by means of set screws 54. The lower member 53' is of L-shape and provided at its upper end with a pair of elongated slots 55 through which pass a pair of securing screws 56 for adjustably securing the members 53 and 53' together in adjusted position to accommodate the same to the particular position taken by the bridge members 26 when connected to the hangers 24. The lower end of each bridge hanger 50 extends laterally beneath the bracket 42 and is rigidly secured thereto by means of the screws 43, such screws also being of utility for securing the bridge member 26 to the bracket 42 as heretofore described. To the lower end of the bracket 42 is rigidly secured the upper end of a raceway 57 by means of securing screws 58. At each side of the lower end of the bracket 42 are attached, in vertical disposition, flat side pieces or guide plates 59 by means of screws 60, said guide plates being provided at the front edges thereof with inwardly extending flanges 61. These flanges are suitably spaced from the forward end of the bracket as well as from the lower end 44 of the bridge member 26 for providing therebetween a space adapted to freely receive and guide a staple to the raceway. The lower end of the flanges 61 also may be provided with downwardly projecting or extending portions 62 which are curved and disposed within the raceway 57 for further providing means for guiding the movement of the staples thereto and therethrough.

Upon the hub 64 of each separator hanger 24 may be secured a pusher bracket 65, as by screws 66. The extended or free end of the pusher bracket 65 may have rigidly secured thereto a laterally extending guide piece 65' adapted to overhang the bridge member 26. The guide piece 65' may be provided with an aperture through which may conveniently slide a plunger 67 provided at one end thereof with a pad 68 and at the other end thereof with an abutment nut 69 and a lock nut 70. A coiled spring 71 may be interposed between the pad and the guide piece to normally move or urge said pad away from the guide piece and for acting as a cushioning means whenever the pad is moved toward said guide piece. When the hooks 16 and the hanger portion 24 are angularly reciprocated with the shaft 17 the pad 68 will be adapted to move into and out of contact with the bridge or the staples on said bridge so that as the hooks are moved upwardly the pad will be caused to move downwardly towards the bridge to contact with whatever staples that might be passing or located upon said bridge so as to push or urge such staples onward and downwardly.

The lower end portion of the raceway in the form of a chute 72 is secured to the upper end portion of the raceway 57 by means of rivet bolts 73, the lower end of said chute being suitably fastened to the driving and clinching means by an attached bracket 74 and screw 75. This chute is hollow and may be substantially rectangular in cross section with the upper side thereof comprising relatively narrow over-hanging flanges but otherwise open so that the interior of the chute may be visible and freely accessible to the operator of the machine in the event it is desired to move staples therefrom. The flanges will act to prevent the line of staples from buckling and of any of the staples jumping out of the chute.

Intermediate the ends of the chute 72 there is attached to the lower surface thereof a strap member 76, as by rivets 77, the lower end of the strap being provided with a pair of bearing members 78 between which may be pivotally supported a feed trigger 79. The upper end of the feed trigger is provided with a pair of upwardly extending spaced teeth or projections 80 and 80', said teeth being adapted to extend into the interior of the chute 72 through an opening provided in the lower side thereof. The lower end of the trigger may be provided with a flat spring 81 with the lower end of said spring suitably secured to the lower end of the trigger 79 by means of a screw 82 and a nut 83 and with the upper end of the spring bearing against the under flat surface of the strap member 76, the spring normally acting to move the lower end of the trigger forwardly of the machine so that the projection or tooth 80 will project or extend into the interior of the chute while the tooth 80' will be withdrawn therefrom about the pivot 84. Normally the projection or tooth 80 projects within the interior of the chute 72 to impede the downward progress of a staple being fed to the driving and clinching means. When, however, it is desired to release said staple so that it may slide by gravity to the driving and clinching means the tooth 80' is permitted to project into the interior of the chute 72 as the tooth 80 is being withdrawn to allow a staple to be fed so as to impede the progress of the next or succeeding staples so that only one staple will be permitted to slide into the driving and clinching means at a time. To accomplish this I have provided on the reciprocating chuck 85 of the driving and clinching means a feed post 86 having at its lower end an integral flange 87 by which the post may be rigidly secured to the top of the chuck 85 by means of a screw 88. A pin 89 may be also provided to project into alined recesses located in the post and in the chuck to prevent angular movement of the post about the axis of the screw 88. The upwardly extending portion of the post is adapted to contact with the end 90 of the screw 82 such end forming an abutment means for the post 86. It will be apparent from the above that when the post 86 is reciprocated with the driving and clinching means its contact with the end 90 of the screw 82 will move the lower end of the trigger 79 rearwardly to swing it about its axis and cause the withdrawal of the projection 80 from the interior of the chute 72 and the simultaneous entrance of the projection 80' within said chute in order to relieve the lowermost staple and to impede the downward movement of the succeeding or second staple until the post 86 is moved away from the end 90 of the screw 82. Upon the forward movement of the post 86 the spring 81 will become operative to immediately swing the lower end of the trigger 79 forwardly to cause the entrance of the projection 80 into and the withdrawal of the projection 80' from the interior of the chute 72 so as to release the staple held back by the projection 80' to permit the same to move downwardly and to contact with the projection 80 where it is held until the next operation for relieving it occurs as above described. It may be observed that the passage leading from the end 62 of the bridge to the projection 80 is normally filled with a series of staples with the head of the last staple just slightly below the top surface of the lower end of the bridge 26.

From the above it may be seen that the staples may slide successively along the separating members, the hangers and bridge members and thence over the end of the latter into the passage leading from the lower end of the bridge member to the hopper 57 and the chute 72. The leading staple will rest by its head against the projection 80 in the chute 72 with the succeeding staples extending serially along said passage to the lower end of said bridge and with a line of straddling staples hanging upon the inclined surface of the bridge member 26. Such staples will remain in that position until the uppermost staple in the passage adjacent the lower end of the bridge member succeeds in moving downwardly whereupon the leading staple from the lower end of said bridge will fall therefrom into said passage and the remaining staples of the line hanging upon the inclined surface of the bridge will move downwardly the distance of one staple accordingly. If there is any tendency for the staples upon the bridge to remain stationary the pad 68 and the plunger 67 will operate to engage some of said staples in order to force a downward movement of the line of staples thus held upon said bridge member.

Upon the machine may be mounted, in suitable bearings, a thrust shaft 92 to the ends of which may be secured cranks 93. To the ends of these cranks may be pivotally connected the upper ends of the thrust rods 94 with the lower ends thereof connected to a driving and clinching means, of any suitable type, as are disclosed in my copending applications hereinbefore referred to.

The machine may also be provided with power means driven by a motor suitably supported upon the machine frame in any appropriate position and suitably secured to the parts above described in the manner hereinbefore also fully disclosed in my above mentioned copending applications.

In operating the device, made staples of the size chosen are placed within the hopper and the latter is caused to reciprocate angularly about the axis of the shaft 6 from the continual rotation of the shaft 15 and the parts connected therefrom to the hopper so as to incline the bottom surface of the hopper at opposite angles in such a manner that the staples may be caused to move backwardly and forwardly over said surface as the hopper is reciprocated. This causes a conglomerate mass or quantity of staples to periodically move toward the angularly reciprocated separating hooks, which are also continually operating, by which staples may be separated and carried from the hopper to a position where the staples may be transferred to, moved over and gathered upon the bridge members. During the movement of the hopper a certain number of the staples will engage with the spurs of the separating hooks which are reposing freely upon the lower surface of the pan or hopper in such a way that the heads of the staples will ride over the surfaces 22 and 23 of the hooks and with the legs of the staples depending on each side of the hooks adjacent the lateral faces thereof. The trap or guard members are secured to the separating hooks to permit the staples to slide therethrough in single succession over each separator and to prevent any entangled, imperfect or deformed staples from passing therethrough.

The continual rotation of the shaft 15 through the crank 35, link 33 and arm 30, as clearly shown in Figs. 3, 4, 5 and 6 imparts an angular reciprocation to the separating hooks in time relation with the reciprocation of the hopper so that as the hopper is inclined to its uppermost position the separating hooks are moved downwardly into the pan or hopper with the spurs thereof coming in contact with the bottom of the pan and resting thereupon, irrespective of further movement of the shanks thereof, as permitted by the pivotal connection 21, thereby preventing any injury to the hopper from the contact of the hooks therewith or by reason of any jamming tendencies thereof against any loose staples that might be left upon the bottom of the hopper in the path of the hooks. Moreover the spurs assume a position upon the bottom of the pan so as to more effectively receive the staples as the same are caused to slide downwardly in the pan or hopper. It will be apparent also that as the crank 30 reaches its lowermost position it will be brought suddenly into contact with the stop member 38 thereby imparting to the hooks a jarring effect to loosen therefrom any staples that might be entangled thereupon or irregularly positioned which might interfere with the proper subsequent operation of the hooks. Upon further rotation of the shaft and the connected parts leading to the separating hooks, the latter are caused to move upwardly, and at the same time the hopper is caused to move downwardly, and the separating hooks are brought into an elevated position wherein any staples raised therewith will be adapted to slide downwardly over the surfaces 22 and 23 of the hooks and hangers onto the bridge member 26 to the end 44 of the bridge members and finally dropping into the passage leading from the end of the bridge member to the raceway. The inclination of the separating members, when in the uppermost position, and the bridge member are such that with the lines of staples arranged thereon the weight of the latter is sufficient to force the leading staples from the separating members over the bridge members to the lower end thereof and to normally urge movement of the staples toward the passageway leading to the raceway. As the staples in said passage move downwardly the end or leading staple on the lower end of the bridge is permitted to move and drop into said passage to follow those already moving downwardly therein.

At the time when it is desired to drive staples or to feed staples to the driving and clinching mechanism, any suitable means, such as is disclosed in my aforesaid copending applications, may be controlled to operate the thrust shafts 92, to which are connected the thrust rods 94. As the latter are caused to reciprocate vertically the chuck 85, connected thereto by the link 95, will be reciprocated horizontally to and from the front of the machine whereby the feed post 86, secured to such chuck, will also receive a like reciprocation to move to and from the abutment end of the screw 82. On the rearward stroke of said feed post contact therebetween and the end 90 of the screw 82 causes rearward movement of the lower end of the trigger 79 to thereby withdraw the projection 80 from and to enter the projection 80' into the chute 72. The leading staple which was previously held from movement by the projection 80 is now released and permitted to pursue its course down the chute 72 to the lower end thereof into the driving and clinching mechanism in time to be operated upon by the driver connected to the chuck 85. On the other hand the projection 80' enters into the chute 72 in time to prevent the succeeding staple from also moving downwardly in the chute. As the chuck is then moved in its forward stroke and feed post 86 moves away from the contact end 90 of the trigger 79 the spring 81 becomes immediately operative to move the lower end of the trigger forwardly and cause an entrance of the projection 80 into and the simultaneous withdrawal of the projection 80' from the passage in the chute 72 so that the staple previously held from movement by the projection 80' is now permitted to move downwardly into engagement with the projection 80 preparatory to its feeding movement to the driving and clinching means similar to the feed of the preceding staple. The staples are held in contact with the projections 80 and 80' by the heads of said staples with the legs of the staples projecting downwardly in the chute.

The separating members, the guiding members, including the hangers and the bridges, and the feeding devices, including the chutes and the trigger devices, are all adjustable relative to each other transversely of the machine for spacing the several separating, guiding and feeding devices the proper distances apart the staples are to be driven and clinched. Such parts are then secured into adjusted position by set screws 18 for the separating hooks and screws 54 for the bridge hangers and members supported thereby. Moreover, clamp members 96 and screws 96' may be used to clamp the driving and clinching means in adjusted relation.

It will be apparent from the above that I have provided a machine of the character described with a simple and efficient means for feeding separated staples from their transferred position from a hopper to their position where the driving and clinching means are adapted to operate thereon to complete the stapling operation upon a carton 97 or like package.

Having thus described herein one embodiment of my invention, it is to be understood, however, that such invention is not limited to the particular details herein described or shown upon the drawing but that the same comprehends other forms or device adapted to carry out the results herein disclosed without departing from the spirit of my invention and the scope of the appended claims.

Having thus described my invention what I claim as new and desire to secure by Letters Patent is:

1. In a stapling machine provided with staple separating means and staple driving means arranged to reciprocate horizontally, the combination of inclined means connected between said staple separating and staple driving means over which separated staples hang vertically and are adapted to slide gravitationally, means connected to said inclined means for successively releasing said staples to allow the same to move gravitationally to said driving means, means to turn said staples into a horizontal position in front of said driving means, means on said driving means for operating said releasing means in time relation with the operation of said driving means, and resilient means for returning said releasing means to inoperative position.

2. In a stapling machine comprising staple separating means and staple driving means arranged to reciprocate horizontally, the combination of an inclined means for receiving said separated staples in vertically depending and gathered position, a second inclined means adapted to successively receive and guide said staple from said first inclined means, reciprocable means connected to said second inclined means for normally impeding the movement of said staples relative thereto and adapted when reciprocated to release the leading staple of said staples and to simultaneously impede the succeeding staple of said staples in one phase of its reciprocation and to subsequently successively release and impede said succeeding staple in another phase of its reciprocation, means on said driving means for effecting a reciprocation of said reciprocable means and means operative to turn each staple after it is released to bring it into a horizontal position in front of said driving means.

3. In a stapling machine comprising a reciprocable staple holding hopper, reciprocable staple separating hooks and staple driving and clinching means, the combination of a bridge for receiving sparated staples from said hooks, means connected to said hooks for intermittently urging a movement of said staples over said bridge, means connected to said bridge adapted to receive said staples from said bridge in succession, said last mentioned means including means to guide said staples to a feeding means, feeding means connected to said staple guiding means for intermittently and successively feeding said staples to said driving and clinching means and means carried upon said driving means for operating said feeding means.

4. In a stapling machine comprising staple holding means, staple separating means, and staple driving means and arranged to be reciprocated horizontally, the combination of a staple guiding and feeding means connected between said staple separating means and said staple driving means, said staple guiding and feeding means comprising an inclined guide way over which said staples hang vertically and are adapted to slide gravitationally, a movable trip device comprising a pair of spaced staple engaging projections adapted to project into the path of the staples over said guiding means, means connected to said trip means for normally maintaining one of said projections in and another of said projections out of said path, means connected with said driving means and movable therewith for withdrawing said first mentioned projection from and for inserting said second mentioned projection into said path whereby the staples are successively released and fed to said driving means and means to turn said staples after their release into horizontal position in front of said driving means.

5. In a stapling machine the combination of an inclined raceway, a bridge or gathering bar on which staples are brought by gravity to said raceway on which said staples are adapted to hang vertically, a trigger device in said raceway, a staple driving mechanism, means to reciprocate said driving mechanism, a feed post carried by said driving mechanism and arranged at one end of its travel to operate said trigger device whereby one staple is released from said trigger device for each complete reciprocation of said driving mechanism and means to bring each staple after it has been released from a vertical to a horizontal position in front of said driving means.

In witness whereof, I have hereunto set my hand this 21st day of October, 1919.

HARRISON B. WALTER.